United States Patent
Hong et al.

(10) Patent No.: US 9,560,337 B2
(45) Date of Patent: Jan. 31, 2017

(54) DIGITAL BROADCAST SIGNAL PROCESSING METHOD AND DEVICE

(75) Inventors: Hotaek Hong, Seoul (KR); Jeehyun Choe, Seoul (KR); Jinpil Kim, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 256 days.

(21) Appl. No.: 14/239,751

(22) PCT Filed: Aug. 29, 2012

(86) PCT No.: PCT/KR2012/006888
§ 371 (c)(1),
(2), (4) Date: Feb. 19, 2014

(87) PCT Pub. No.: WO2013/032221
PCT Pub. Date: Mar. 7, 2013

(65) Prior Publication Data
US 2014/0218474 A1 Aug. 7, 2014

Related U.S. Application Data

(60) Provisional application No. 61/529,253, filed on Aug. 31, 2011.

(51) Int. Cl.
*H04N 13/00* (2006.01)
*H04N 21/2343* (2011.01)
(Continued)

(52) U.S. Cl.
CPC ...... *H04N 13/0048* (2013.01); *H04N 13/0059* (2013.01); *H04N 13/0066* (2013.01);
(Continued)

(58) Field of Classification Search
CPC ............ H04N 13/0048; H04N 13/0059; H04N 13/0066; H04N 19/30; H04N 19/597; H04N 19/70; H04N 21/234327; H04N 21/23605; H04N 21/2362; H04N 21/631; H04N 21/816; H04N 2213/003
See application file for complete search history.

(56) References Cited

U.S. PATENT DOCUMENTS

2010/0315486 A1* 12/2010 Lee .................... H04N 13/0048
348/42
2011/0090306 A1 4/2011 Suh et al.
(Continued)

FOREIGN PATENT DOCUMENTS

CN 1613263 A 5/2005
CN 101919259 A 12/2010
(Continued)

OTHER PUBLICATIONS

International Search Report from PCT/KR2012/006888 dated Dec. 21, 2012.
(Continued)

*Primary Examiner* — Peter D Le
(74) *Attorney, Agent, or Firm* — Dentons US LLP

(57) ABSTRACT

The present application relates to a device and method for processing digital broadcast signals comprising three-dimensional images. According to one embodiment of the present invention, the digital broadcast signal processing method comprises the steps of: encoding a video stream of a two dimensional reference image; encoding a video stream of an additional image, for generating a binocular-disparity three-dimensional image together with the encoded two dimensional reference image; generating signaling information such that the video stream of the encoded additional image is processed only in a three-dimensional image signal receiver; generating a first broadcast signal comprising the video stream of the encoded reference image; generating a second broadcast signal comprising the video stream of the encoded additional image and the signaling information; and respectively sending the first broadcast signal and the second broadcast signal over different channels.

8 Claims, 25 Drawing Sheets

(51) Int. Cl.
    *H04N 21/236*    (2011.01)
    *H04N 21/2362*   (2011.01)
    *H04N 21/81*     (2011.01)
    *H04N 19/597*   (2014.01)
    *H04N 19/70*    (2014.01)
    *H04N 19/30*    (2014.01)
    *H04N 21/63*    (2011.01)

(52) U.S. Cl.
    CPC ........... *H04N 19/30* (2014.11); *H04N 19/597* (2014.11); *H04N 19/70* (2014.11); *H04N 21/2362* (2013.01); *H04N 21/23605* (2013.01); *H04N 21/234327* (2013.01); *H04N 21/631* (2013.01); *H04N 21/816* (2013.01); *H04N 2213/003* (2013.01)

(56) References Cited

U.S. PATENT DOCUMENTS

2011/0141364 A1   6/2011  Lee et al.
2011/0157309 A1*  6/2011  Bennett .................... G06F 3/14
                                                 348/43
2011/0181693 A1*  7/2011  Lee ..................... H04N 19/597
                                                 348/43
2011/0181694 A1   7/2011  Kim et al.

FOREIGN PATENT DOCUMENTS

| KR | 10-2007-0060951 A | 6/2007 |
| KR | 10-2010-0048335 A | 5/2010 |
| KR | 10-2010-0050426 A | 5/2010 |
| KR | 10-2011-0043503 A | 4/2011 |
| WO | 2010-076933 A1 | 7/2010 |

OTHER PUBLICATIONS

International Standard ISO/IEC 13818-1:"Information Technology—Generic Coding of Moving Pictures and Associated Audio Information :Systems"—Recommendation ITU-T H.222.0 (2000E), International Standard ISO/IEC, vol. 13818-1, Dec. 1, 2000(Dec. 1, 2000), XP002601409.

* cited by examiner

Figure 1

| Video element | Possible stream kind |
|---|---|
| Primary video element | 2D stream (MPEG-2, AVC/H.264)<br>Phase 1 3DTV video (frame-compatible 3D video coded by AVC/H.264) |
| Secondary video element | Depth map or disparity map (with optional occlusion, transparency information) MVC extension<br>2D stream (secondary image in a 3D system using a dual independent stream method method such as MPEG-2, AVC/H.264, etc.)<br>Enhancement signal for Phase 1 3DTV video (for the purpose of providing full resolution L/R) |

Figure 3

| Syntax | No. of bits | Format |
|---|---|---|
| event_information_table_section ( ) { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j<num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text ( ) | var | |
|         reserved | 4 | '1111' |
|         descriptors_length | 12 | |
|         for (i = 0; i < N; i++) { | | |
|             descriptor( ) | | |
|         } | | |
|     } | | |
|     CRC_32 | 32 | rpchof |
| } | | |

Figure 4

| Syntax | No. of bits | Format |
|---|---|---|
| event_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (sync_type!=0x0) { | | |
|         avail_time_start | 32 | uimsbf |
|     } | | |
|     if (enhancement_type==0x1 \|\| enhancement_type==0x2) { | | |
|         linked_TSID | 16 | uimsbf |
|         linked_program_number | 16 | uimsbf |
|         reserved | 3 | '111' |
|         linked_elementary_PID | 13 | uimsbf |
|     } | | |
|     else if (event_enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

Figure 5

| Field | Meaning |
|---|---|
| 0x0 | Scalable video service (2D) |
| 0x1 | 3D stereoscopic service |
| 0x2 | 3D multiview service |
| 0x3 | UD video service |
| 0x4 ~ | Reserved |

(a)

| Field | Meaning |
|---|---|
| 0x0 | This event contains all necessary components of a service (enhancement data is also contained as the component of the event and is received) |
| 0x1 | Enhancement data is received via a different channel/path and the type of the reception path is equal to that of the event. (for example, if the event is a terrestrial wave, enhancement data thereof is also received via another channel of the terrestrial wave.) Detailed path information of enhancement data uses linked_TSID, linked_program_number. |
| 0x2 | This event includes only enhancement data and essential data is transmitted via the same type of path. That is, enhancement data and essential data are transmitted via the terrestrial wave. Similarly, detailed path information of essential data uses a linked_TSID, linked_program_number field. |
| 0x3 | Enhancement data of this event is received via Internet. Path information accessing enhancement data uses internet_linkage_information. |
| 0x4 | Reserved |

| Field | Meaning |
|---|---|
| 0x0 | The component of the event and the enhancement data are simultaneously transmitted. (synchronized transmission) |
| 0x1 | The enhancement data is transmitted later than the event. (For normal 3D viewing, the event is recorded and linked/synthesized with the enhancement data received later.) |
| 0x2 | The enhancement data was already transmitted before the event and, for normal 3D viewing, the event component received in real time and already received/stored enhancement data are linked/synthesized.) |
| 0x3 | This is similar to 001, but synchronized transmission of the enhancement data is also possible. |
| 0x4 | This is similar to 010, but synchronized transmission of the enhancement data is also possible. |

( a )

| Field | Meaning |
|---|---|
| 0x02 | MPEG-2 video stream |
| 0x1B | AVC/H.264 video stream |
| 0x1F | SVC video sub-bitstream |
| 0x20 | MVC video sub-bitstream |
| 0x23 | additional video stream coded by MPEG-2 video |
| 0x24 | additional video stream coded by AVC/H.264 video |
| 0x25 | depth (disparity) map coded by MPEG-2 video |
| 0x26 | depth (disparity) map coded by AVC/H.264 video |
| Others | Unspecified or reserved |

( b )

| Field | Meaning |
|---|---|
| 0x0 | The same resolution as primary video |
| 0xXY | The sampling factor of the enhancement data is $1/(X+1)$ of the reference image in width and is $1/(Y+1)$ of the reference image in height. |

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N; i++) { | | |
|         descriptor( ) | | |
|     } | | |
|     for (i=0; i<N1; i++) { | | |
|         stream_type | 8 | uimsbf |
|         reserved | 3 | bslbf |
|         elementary_PID | 13 | uimsbf |
| | | uimsbf |
|         reserved | 4 | bslbf |
|         ES_info_length | 12 | bslbf |
|         for (i=0; i<N2; i++) { | | |
|             descriptor() | | |
|         } | | |
|     } | | |
|     CRC_32 | 32 | rpchof |
| } | | |

Figure 8

| Syntax | No. of bits | Format |
|---|---|---|
| program_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 3 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if(enhancement_type==0x1 \|\| enhancement_type==0x2) { | | |
|         linked_TSID | 16 | uimsbf |
|         linked_program_number | 16 | uimsbf |
|         reserved | 3 | '111' |
|         linked_elementary_PID | 13 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

Figure 9

| Syntax | No. of bits | Format |
|---|---|---|
| terrestrial_virtual_channel_table_section ( ) { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_chnnels_in_section | 8 | uimsbf |
|     for (i=0; i<num_channels_insection; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequnecy | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++) { | | |
|             descriptor( ) | | |
|         } | | |
|     } | | |
|     reserved | 6 | '111111' |
|     additional_descriptor_length | 10 | uimsbf |
|     for (i=0; i<N; i++) { | | |
|         additional_descriptor( ) | | |
|     } | | |
|     CRC_32 | 32 | rpchof |
| } | | |

Figure 10

| Syntax | No. of bits | Format |
| --- | --- | --- |
| channel_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if(enhancement_type==0x1 \| enhancement_type==0x2) { | | |
|         linked_TSID | 16 | uimsbf |
|         linked_program_number | 16 | uimsbf |
|         reserved | 4 | '1111' |
|         linked_major_channel_number | 10 | uimsbf |
|         linked_minor_channel_number | 10 | uimsbf |
|         linked_source_id | 16 | uimsbf |
|         reserved | 3 | '111' |
|         linked_elementary_PID | 13 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

Figure 11

| Syntax | No. of bits | Identifier |
|---|---|---|
| service_description_section ( ) { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    transport_stream_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    original_network_id | 16 | uimsbf |
|    reserved_future_use | 8 | bslbf |
|    for (i = 0; i < N; i++) { | | |
|       service_id | 16 | uimsbf |
|       reserved_future_use | 6 | bslbf |
|       EIT_schedule_flag | 1 | bslbf |
|       EIT_present_following_flag | 1 | bslbf |
|       running_status | 3 | uimsbf |
|       free_CA_mode | 1 | bslbf |
|       descriptors_loop_length | 12 | uimsbf |
|       for (i = 0; i < N; i++) { | | |
|          descriptor () | | |
|       } | | |
|    } | | |
|    CRC_32 | 32 | rpchof |
| } | | |

Figure 12

| Syntax | No. of bits | Format |
|---|---|---|
| service_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 3 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (enhancement_type= =0x1 \|\| enhancement_type= =0x2) { | | |
|         linked_TSID | 16 | uimsbf |
|         linked_original_network_id | 16 | uimsbf |
|         linked_service_id | 16 | uimsbf |
|         reserved | 3 | '111' |
|         linked_elementary_PID | 13 | uimsbf |
|     } | | |
|     else if (enhancement_type= =0x3) { | | |
|         internet_linkage_information ( ) | | |
|     } | | |
|     if (enhancement_stream_format= =0x25 \|\| | | |
|     enhancement_stream_format= =0x26) { | | |
|         disparity_near | 16 | tcimsbf |
|         disparity_far | 16 | tcimsbf |
|     } | | |
| } | | |

Figure 13

| Syntax | No. of bits | Identifier |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i = 0; i < N; i++) { | | |
|         event_id | | |
|         start_time | 16 | uimsbf |
|         duration | 40 | bslbf |
|         runinng_status | 24 | uimsbf |
|         free_CA_mode | 3 | uimsbf |
|         descriptors_loop_length | 1 | bslbf |
|         for (i = 0; i < N; i++) { | 12 | uimsbf |
|             descriptor ( ) | | |
|         } | | |
|     } | | |
|     CRC_32 | 32 | rpchof |
| } | | |

Figure 14

| Syntax | No. of bits | Format |
|---|---|---|
| event_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (sync_type!=0x0) { | | |
|         avail_time_start | 32 | uimsbf |
|     } | | |
|     if (enhancement_type==0x1 \| enhancement_type==0x2) { | | |
|         linked_event_id | 16 | uimsbf |
|         linked_TSID | 16 | uimsbf |
|         linked_original_network_id | 16 | uimsbf |
|         linked_service_id | 16 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

Figure 15

| stream_content | component_type | Description |
|---|---|---|
| 0x01 | 0x11 | MPEG-2 video, non-essential 3D video, 25Hz |
| 0x01 | 0x12 | MPEG-2 video, non-essential 3D video, 30Hz |
| 0x01 | 0x13 | MPEG-2 video, depth/disparity map data |
| 0x05 | 0x84 | H.264/AVC video, non-essential 3D video, 25Hz |
| 0x05 | 0x85 | H.264/AVC video, non-essential 3D video, 30Hz |
| 0x05 | 0x86 | H.264/AVC video, depth/disparity map data |
| 0x05 | 0x86 | Enhancement layer, (enhancement to frame-compatible 3D service), 25Hz |
| 0x05 | 0x87 | Enhancement layer, (enhancement to frame-compatible 3D service), 30Hz |
| 0x05 | 0x88 | MVC enhancement layer, (enhancement to service-compatible 3D service), 25Hz |
| 0x05 | 0x89 | MVC enhancement layer, (enhancement to service-compatible 3D service), 30Hz |

Figure 20

| Syntax | No. of bits | Mnemonic |
|---|---|---|
| transport_packet ( ) { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if (adaptation_field_control= = '10' \|\| adaptation_field_control= = '11' ) { | | |
|         adaptation_field ( ) | | |
|     } | | |
|     if (adaptation_field_control= = '01' \|\| adaptation_field_control= = '11' ) { | | |
|         for ( i=0; i <N; i++ ) { | | |
|             data_byte | 8 | uimsbf |
|         } | | |
|     } | | |
| } | | |

Figure 21

| Syntax | No. of bits | Format |
|---|---|---|
| adaptation_field ( ) { | | |
|     adaptation_field_length | 8 | uimsbf |
|     if ( adaptation_field_length > 0 ) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | | |
|         if (PCR_flag=='1') { | | |
|             program_clock_reference_base | 33 | uimsbf |
|             Reserved | 6 | bslbf |
|             program_clock_reference_extension | 9 | uimsbf |
|         } | | |
|         if (OPCR_flag=='1') { | | |
|             original_program_clock_reference_base | 33 | uimsbf |
|             Reserved | 6 | bslbf |
|             original_program_clock_reference_extension | 9 | uimsbf |
|         } | | |
|         if (splicing_point_flag=='1') { | | |
|             splice_countdown | 8 | tcimsbf |
|         } | | |
|         if (transport_private_data_flag=='1') { | | |
|             transport_private_data_length | 8 | uimsbf |
|             for (i=0; i < transport_private_data_length; i++) { | | |
|                 private_data_byte | 8 | bslbf |
|             } | | |
|         } | | |
|         if (adaptation_field_extension_flag=='1') { | | |
|             adaptation_field_extension_length | 8 | uimsbf |
|             ltw_flag | 1 | bslbf |
|             piecewise_rate_flag | 1 | bslbf |
|             seamless_splice_flag | 1 | bslbf |
|             Reserved | 5 | bslbf |
|             if (ltw_flag=='1') { | | |
|                 ltw_valid_flag | 1 | bslbf |
|                 ltw_offset | 15 | uimsbf |
|             } | | |
|             if (piecewise_rate_flag=='1') { | | |
|                 reserved | 2 | bslbf |
|                 piecewise_rate | 22 | uimsbf |
|             } | | |
|             if (seamless_splice_flag=='1') { | | |
|                 splice_type | 4 | bslbf |
|                 DTS_next_AU[32..30] | 3 | bslbf |
|                 marker_bit | 1 | bslbf |
|                 DTS_next_AU[29..15] | 15 | bslbf |
|                 marker_bit | 1 | bslbf |
|                 DTS_next_AU[14..0] | 15 | bslbf |
|                 marker_bit | 1 | bslbf |
|             } | | |
|             for ( i = 0; i < N; i++) { | | |
|                 reserved | 8 | bslbf |
|             } | | |
|         } | | |
|         for (i = 0; i < N; i++) { | | |
|             stuffing_byte | 8 | bslbf |
|         } | | |
|     } | | |
| } | | |

Figure 22

| Syntax | No. of bits | Format |
|---|---|---|
| video_frame_info_data_byte ( ) { | | |
| frame_info_type | 7 | uimsbf |
| video_frame_info | 33 | uimsbf |

(a)

| frame_info_type | video_frame_info |
|---|---|
| 0x01 | Decoding order number |
| 0x02 | Display order number |
| 0x03 | PTS value (with clock frequency of 90 kHz) |
| 0x04 | Absolute display time - The MSB of this field being set to '0' the remaining bits denote 32-bit unsigned integer expressed as the number of GPS seconds since 00:00:00 UTC, January 6, 1980 |
| 0x05 | Modified PTS – this is a relative time stamp with the value of video_frame_info of the first picture of the video element being 0. The video_frame_info of each picture is relative count since the display time of the first picture of the video element. The count is in units of period of system clock frequency of 90kHz. |
| others | Reserved |

(b)

DIGITAL BROADCAST SIGNAL PROCESSING METHOD AND DEVICE

This application is a 35 USC §371 National Stage entry of International Application No. PCT/KR2012/006888, filed Aug. 29, 2012, and claims priority to U.S. Provisional Application No. 61/529,253 filed Aug. 31, 2011, both of which are hereby incorporated by reference in its entirety.

TECHNICAL FIELD

The present invention relates to a device and method for processing a digital broadcast signal including three-dimensional (3D) video, and more particularly, to a processing device and method for transmitting and receiving a digital broadcast signal including 3D video via a plurality of channels or a plurality of paths and displaying the 3D video.

BACKGROUND ART

As 3D televisions (3DTV) have come into widespread use, 3D video content has come into widespread use and 3D video content has been transmitted through a digital broadcast.

In general, 3D video provides a stereoscopic effect using the principle of stereovision. Since a human feels a perspective effect through binocular parallax due to an interval between the eyes spaced apart from each other by about 65 mm, 3D video is provided such that a left eye and a right eye view respective plan images, thereby providing a stereoscopic effect and a perspective effect.

Examples of a 3D video display method include a stereoscopic method, a volumetric method, a holographic method, etc. In the stereoscopic method, a left view image to be viewed by a left eye and a right view image to be viewed by a right eye are provided and the left eye and the right eye respectively view the left view image and the right view image through polarized glasses or a display device, thereby perceiving a 3D video effect.

In case of stereoscopic 3D video content, when two similar videos of different views are transmitted, a receiver uses a method of displaying 3D video using the two videos. At this time, the two similar videos of the different views may be transmitted via an existing broadcast channel or separately transmitted via the existing broadcast channel and a separate transmission channel. In this case, the receiver should receive signal information of two videos forming a pair in order to display the two videos as 3D video. When such information is not received, a left-view image and a right-view image forming 3D video may not be distinguished such that the 3D video is not restored. In addition, it is not possible to check a synchronization time of the left-view image and the right-view image and when 3D video can be displayed.

DISCLOSURE

Technical Problem

An object of the present invention devised to solve the problem lies in a device and method for receiving a digital broadcast signal including signal information for displaying 3D video and displaying the 3D video.

Technical Solution

The object of the present invention can be achieved by providing a digital broadcast signal processing method for providing stereoscopic three-dimensional (3D) video including encoding a video stream of two-dimensional (2D) primary video, encoding a video stream of secondary video for generating binocular-parallax 3D video together with the encoded video stream of the 2D primary video, generating signaling information such that the encoded video stream of the secondary video is only processed in a 3D video signal receiver, generating a first broadcast signal including the encoded video stream of the primary video, generating a second broadcast signal including the encoded video stream of the secondary video and the signaling information and transmitting the first broadcast signal and the second broadcast signal via different channels.

In the digital broadcast signal processing method according to the present invention, the generating the signaling information may include generating signaling information requesting that a 2D video signal receiver should not recognize the encoded video stream of the secondary video.

In the digital broadcast signal processing method according to the present invention, the generating the signaling information may include excluding a channel, via which the second broadcast signal is transmitted, from a channel map.

In the digital broadcast signal processing method according to the present invention, the generating the signaling information may include generating signaling information for preventing a 2D video signal receiver from recognizing the encoded video stream of the secondary video.

In the digital broadcast signal processing method according to the present invention, the generating the signaling information may include limiting signaling information of a stream transmitted by the second broadcast signal to only a PAT and deleting a program_loop or setting a program_number to 0.

In another aspect of the present invention, provided herein is a digital broadcast signal processing device for providing stereoscopic three-dimensional video including a first video encoder for encoding a video stream of two-dimensional (2D) primary video, a second video encoder for encoding a video stream of secondary video for generating binocular-parallax 3D video together with the encoded video stream of the 2D primary video, an SI processor for generating signaling information such that the encoded video stream of the secondary video is only processed in a 3D video signal receiver, a first system encoder for generating a first broadcast signal including the encoded video stream of the primary video, a second system encoder for generating a second broadcast signal including the encoded video stream of the secondary video and the signaling information and a transmission unit for transmitting the first broadcast signal and the second broadcast signal via different channels.

In the digital broadcast signal processing device according to the present invention, the SI processor may generate signaling information requesting that a 2D video signal receiver should not recognize the encoded video stream of the secondary video.

In the digital broadcast signal processing device according to the present invention, the SI processor may exclude a channel, via which the second broadcast signal is transmitted, from a channel map.

In the digital broadcast signal processing device according to the present invention, the SI processor may generate signaling for preventing a 2D video signal receiver from recognizing the encoded video stream of the secondary video.

In the digital broadcast signal processing device according to the present invention, the SI processor may limit signaling information of a stream transmitted by the second broadcast signal to only a PAT and delete a program_loop or set a program_number to 0.

Advantageous Effects

According to the digital broadcast signal reception device of the present invention, the following effects are obtained.

According to one embodiment of the present invention, it is possible to receive a digital broadcast signal and to display a 3D video signal.

According to one embodiment of the present invention, it is possible to receive a digital broadcast signal and to check when a 3D video signal can be displayed.

According to one embodiment of the present invention, it is possible to receive a digital broadcast signal and to obtain accurate synchronization information.

According to one embodiment of the present invention, it is possible to support backward compatibility with an existing broadcast signal reception device.

DESCRIPTION OF DRAWINGS

FIG. 1 is a diagram showing a combination of video elements included in 3D video according to one embodiment of the present invention;

FIG. 3 is a diagram showing a syntax structure of an EIT including an event_enhancement_descriptor( ) according to one embodiment of the present invention;

FIG. 4 is a diagram showing a syntax structure of an event_enhancement_descriptor( ) according to one embodiment of the present invention;

FIG. 5(a) is a diagram showing a combined_service_type according to one embodiment of the present invention;

FIG. 5(b) is a diagram showing an enhancement_type according to one embodiment of the present invention;

FIG. 6(a) is a diagram showing a sync_type according to one embodiment of the present invention;

FIG. 6(b) is a diagram showing an enhancement_stream_format according to one embodiment of the present invention;

FIG. 6(c) is a diagram showing an enhancement_stream_sampling_factor according to one embodiment of the present invention;

FIG. 7 is a diagram showing a syntax structure of a PMT including an event_enhancement_descriptor( ) according to one embodiment of the present invention;

FIG. 8 is a diagram showing a syntax structure of a program_enhancement_descriptor( ) according to one embodiment of the present invention;

FIG. 9 is a diagram showing a syntax structure of a TVCT including a channel_enhancement_descriptor( ) according to one embodiment of the present invention;

FIG. 10 is a diagram showing a syntax structure of a channel_enhancement_descriptor( ) according to one embodiment of the present invention;

FIG. 11 is a diagram showing a syntax structure of an SDT including a service_enhancement_descriptor( ) according to one embodiment of the present invention;

FIG. 12 is a diagram showing a syntax structure of a service_enhancement_descriptor( ) according to one embodiment of the present invention;

FIG. 13 is a diagram showing a syntax structure of an EIT including an event_enhancement_descriptor2( ) according to one embodiment of the present invention;

FIG. 14 is a diagram showing a syntax structure of an event_enhancement_descriptor2( ) according to one embodiment of the present invention;

FIG. 15 is a diagram showing a new combination of stream_content and a component_type according to one embodiment of the present invention;

FIG. 20 is a diagram showing a transport_packet( ) according to one embodiment of the present invention;

FIG. 21 is a diagram showing an adaptation_field( ) according to one embodiment of the present invention;

FIG. 22(a) is a diagram showing the syntax of a video_f-rame_info_data_byte according to one embodiment of the present invention;

FIG. 22(b) is a diagram showing the meaning of video_f-rame_info according to a setting value of a frame_info_type according to one embodiment of the present invention;

BEST MODE

Figure 2:
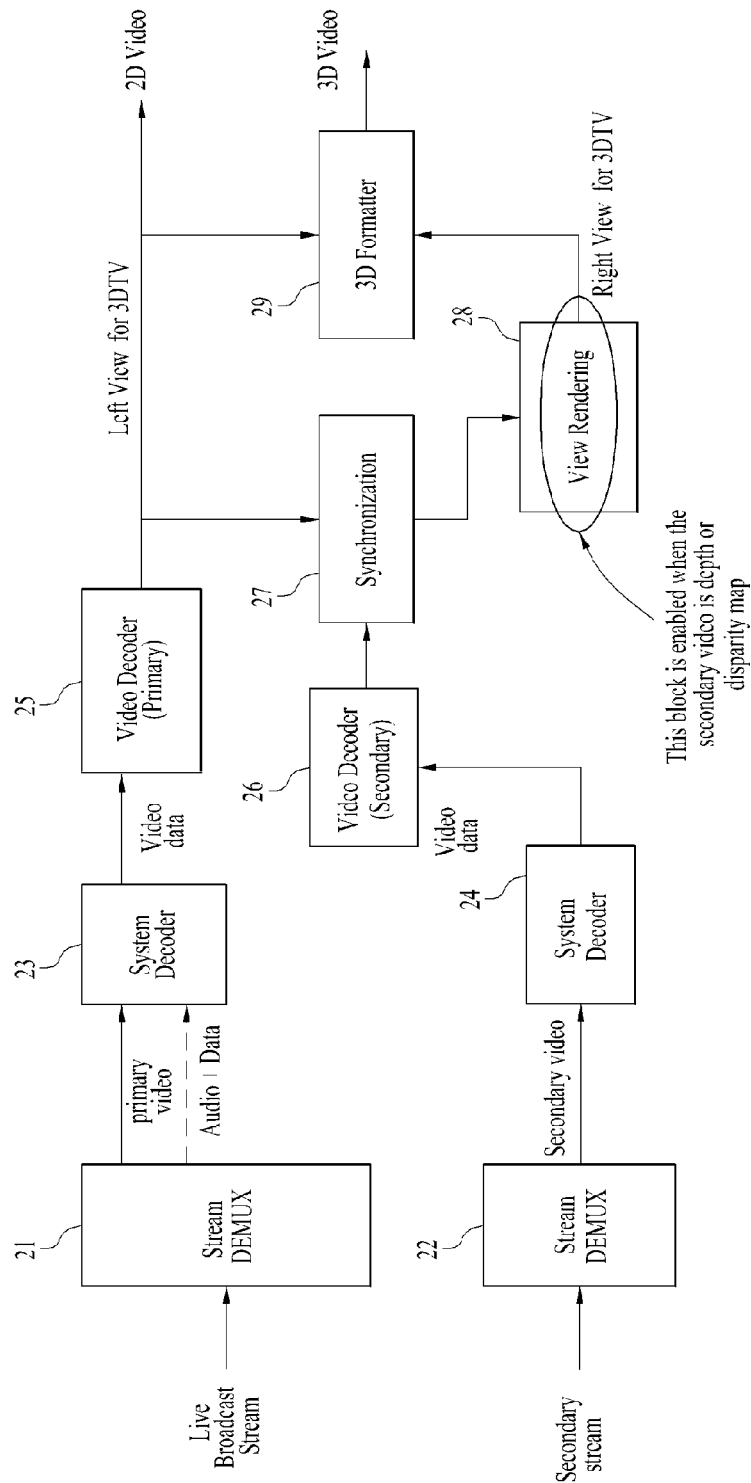
FIG. 2 is a diagram showing a digital broadcast signal reception device according to one embodiment of the present invention.

Hereinafter, the embodiments of the present invention will be described in detail with reference to the accompanying drawings although the present invention is not limited by the embodiments.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A 3D video display method may include a stereoscopic method considering two views and a multiple view image method (a multi-view method) considering three or more views. A conventional single view image is referred to as a monoscopic image method.

The stereoscopic method uses a pair of images, that is, a left view image (hereinafter, referred to as a left image) and a right view image (hereinafter, referred to as a right image), acquired by capturing the same subject using a left camera and a right camera spaced apart from each other by a fixed distance, or a pair of a primary image and a secondary image. Hereinafter, the left and right images and the primary and secondary images are included in a stereoscopic 3D image and may have the same meaning. The multi-view method uses three or more images acquired by capturing the same subject using three or more cameras having constant distances or angles. Hereinafter, although the stereoscopic method is described in one embodiment of the present invention, the present invention is applicable to a multi-view method.

The stereoscopic method according to the present invention includes a side-by-side mode, a top-bottom mode, a checkerboard mode, etc. In the side-by-side mode, a left image and a right image are ½ down-sampled in a horizontal direction, one sampled image is located in a left region and the other sampled image is located in a right region, thereby configuring one stereoscopic image. In the top-bottom mode, a left image and a right image are ½ down-sampled in a vertical direction, one sampled image is located in a top region and the other sampled image is located in a bottom region, thereby configuring one stereoscopic image. In the checker board mode, a left image and a right image are ½ down-sampled to be crossed in vertical and horizontal directions such that two images are combined into one image. However, the stereoscopic method according to the present invention is not limited to the above examples. For example, in a method of providing a 3D video service via a plurality of channels described in the present invention, two images having full resolutions may be transmitted and received without a down-sampling operation to provide a 3D video service.

The stereoscopic method requires additional signal information for coupling a left image and a right image or a primary image and a secondary image included in the same 3D video.

FIG. 1 is a diagram showing a combination of video elements included in 3D video according to one embodiment of the present invention.

When an element configuring a 3D program is composed of two or more video elements, these video elements may include a primary video element and a secondary video element. The primary image element includes two-dimensional (2D) stream coded by motion picture experts group-2 (MPEG-2) or AVC/H.264 or phase1 3DTV video which is frame-compatible 3D video coded by AVC/H.264.

The secondary image element includes depth information (depth map or disparity map), multiview video coding (MVC) extension, secondary image 2D stream in a 3D system using a dual independent stream method, such as MPEG-2 or AVC/H.264, and an enhancement signal for Phase1 3DTV video. The depth map may optionally include occlusion information or transparency information.

FIG. 2 is a diagram showing a digital broadcast signal reception device according to one embodiment of the present invention. The digital broadcast reception device according to the present invention may include a plurality of stream demultiplexers 21 and 22, a plurality of system decoders 23 and 24, a plurality of video decoders 25 and 26, a synchronizer 27, a view rendering unit 28 and an output formatter 29. Here, the view rendering unit 28 operates when depth information (depth map or disparity map) is input as a secondary image element.

The demultiplexers 21 and 22 receive a broadcast stream including a primary video element and a secondary video element and demultiplex the primary video element and the secondary video element. At this time, the demultiplexer for the primary video may also extract an audio element and data.

The extracted primary video element and the secondary video element are respectively input to the system decoders 23 and 24 and the system decoders 23 and 24 extract synchronization information therefrom. The acquired synchronization information is used for matching between the primary video and the secondary video independently decoded by the video decoders 25 and 26.

The decoded primary video element is independently output as primary video to display a 2D video signal.

The synchronizer 27 synchronizes the primary video and the secondary video and outputs the synchronized video to the view rendering unit 28. The view rendering unit 28 is enabled when the secondary video element is depth information and renders the secondary video based on the primary video and the depth information. At this time, when the secondary video element is depth information, the secondary video element cannot provide video but serves as secondary view video by combining the primary video and the depth information by the view rendering unit 28.

When the secondary video element is not depth information but is an image, for example, a 2D secondary video stream in a 3D system using a dual independent stream method such as MPEG-2 or AVC/H.264, the view rendering 28 may not be enabled.

The secondary video (right image or left image) and the primary video (left image or right image) are output on the 3D display via the output formatter 29 as 3D video.

When the primary video is received via a terrestrial wave, the video becomes a view configuring stereoscopic 3D video and the received video is combined with secondary video received via a separate channel, thereby outputting stereoscopic 2D video.

In the following embodiments, assume a transmission scenario that the primary video (e.g., 2D video) is received via an existing broadcast channel, the secondary video (e.g., enhancement video or depth information) is received via a separate channel and the primary video and the secondary video are synchronized in real time.

In a process of outputting 3D video, previously received secondary video may be linked with primary video received in real time to render 3D video.

In order to link the primary video and the secondary video to output a 3D video signal, the following considerations are present.

First, signaling of linkage information of primary video and secondary video is necessary. For example, presence signaling which is information indicating presence of the secondary video linked with the primary video, location signaling which is information about a path (location) of the secondary video linked with the primary video, synchronization/coupling mode signaling which is information about a synchronization or linkage method of the secondary video linked with the primary video, available time signaling which is information about when the secondary video linked with the primary video may be received, format/codec signaling which is information about the format or codec of the secondary video linked with the primary video and depth range signaling for providing depth range information of secondary video and a method of transmitting several pieces of depth information or secondary video in order to provide a 3D video signal having various depth ranges are necessary.

Next, frame level synchronization level for linking primary video and secondary video is necessary. For example, video level signaling or transport stream level signaling is necessary.

In association with receiver operation, as a method of receiving, reproducing and storing secondary video linked with primary video and a method of supporting various depth modes, several secondary videos having multiple depth maps (depth track)/different depth ranges need to be considered.

In association with a method of preventing all the above-described information from having influence on a normal operation of a 2D or 3D receiver, signaling considers a method of acquiring access information of enhancement data including depth data via a channel for receiving primary video, the channel for receiving the enhancement data (hereinafter, the enhancement data includes depth data) cannot provide an independent service, and signaling information provides information about the enhancement data. Additionally, linkage information of a 2D video reception channel may be provided. An existing receiver should unmeaningfully transmit and receive signaling information.

Hereinafter, a descriptor for signaling enhancement data via an SI section will be defined. For convenience, the descriptor does not include a loop but may transmit multiple enhancement data according to circumstance. At this time, in the descriptor, the field is repeated by the number of transmitted enhancement data streams. In particular, this corresponds to depth control implementation via multiple depth map transmission.

First, a signaling method using an EIT of an ATSC PSIP will be described.

FIG. 3 is a diagram showing a syntax structure of an EIT including an event_enhancement_descriptor( ) according to one embodiment of the present invention.

Signaling of enhancement data linked with this event is performed using a descriptor at an event level of the EIT.

A table_id field is an 8-bit field, is set to 0xCB, and indicates that the section belongs to the EIT.

A section_syntax_indicator field is a 1-bit field and the value thereof is set to 1. This means that the section follows a generic section syntax after the section length field.

A private_indicator field is a 1-bit field and is set to 1.

A section_length field is a 12-bit field and indicates the number of bytes from a next field of this field to a section including a CRC_32 field. The value of this field does not exceed 4093.

A source_id field is a 16-bit field and indicates a source_id of a virtual channel for sending an event described in this section.

A version_number field is a 5-bit field and indicates the version number of EIT-i. The version number is incremented by one (modulo 32) if any field of EIT-i is changed. If i and j are different, the version number of EIT-i and the version number of EIT-j are unrelated. This field has the same value as an MGT.

A current_next_indicator field is a 1-bit indicator and is always set to 1 with respect to the EIT section. Currently, the EIT is always applicable.

A section_number field is an 8-bit field and indicates the number of sections.

A last_section_number field is an 8-bit field and indicates the number of the last section.

A protocol_version field serves to allow a table type different from that defined in the current protocol in the future. In the current protocol, only 0 is valid. A value other than 0 will be structurally used in the subsequent version for another table.

A num_events_in_section field is an 8-bit field and indicates the number of the event in the EIT section and indicates that an event is not defined in this section if the value thereof is 0.

An event_id field is a 14-bit field and indicates the ID of the described event. This is used as a part of ETM_id.

A start_time field is a 32-bit field and indicates a start time of an event in GPS seconds after 1980.1.6. 00:00:00 UTC. In any virtual channel, the value of the start_time cannot be smaller than the end_time of a previous event. Here, the end_time is defined as a value obtained by adding the length of the event length_in_seconds to the start_time of the event.

An ETM_location field is a 2-bit field and indicates presence and location of an extended text message (ETM).

A length_in_seconds field indicates the duration of this event in seconds.

A title_length field indicates the length of title_text( ) in bytes and indicates that there is no title of the event if the value thereof is 0.

A title_text( ) field indicates the title of the event of multiple string structure formats.

A descriptors_length field indicates the total length of the following event descriptor in bytes. 0 or more descriptors are included in the EIT by for-loop included in descriptor( ). The type of the descriptor defined to be used in the EIT may include the content_advisory_descriptor( ), the caption_service_descriptor( ), the AC-3 audio_stream_descriptor( ), etc. The event_enhancement_descriptor( ) of the present invention may be included in the descriptor( ).

A CRC_32 field is a 32-bit field and indicates a CRC value for a zero output of a register within a decoder.

FIG. 4 is a diagram showing a syntax structure of an event_enhancement_descriptor( ) according to one embodiment of the present invention.

The event_enhancement_descriptor( ) of the present invention includes a combined_service_type, an enhancement_type, an enhancement_right_flag, a sync_type, an enhancement_stream_format, an enhancement_stream_sampling_factor, an avail_time_start, a linked_TSID, a linked_program_number, a linked_elementary_PID, an internet_linkage_information, a disparity_near and a disparity_far.

FIG. 5(a) is a diagram showing a combined_service_type according to one embodiment of the present invention. The combined_service_type is a field indicating a service type provided when components received/transmitted via two or more separate paths/channels are combined, that is, means the type of a final service provided by combining the event and enhancement data received via a location specified in this descriptor. This indicates a 2D scalable video service if the value of combined_service_type is 0x0, indicates a 3D stereoscopic video service if the value of combined_service_type is 0x1, indicates a 3D multi-view service if the value of combined_service_type is 0x2, and indicates a ultra definition (UD) video service if the value of combined_service_type is 0x3. Hereinafter, in the present invention, the 3D stereoscopic service in the case in which the combined_service_type is 0x1 will be focused upon.

The enhancement_right_flag indicates the left view/right view of the video when the view of the stereoscopic 3D video service is rendered using the enhancement data. If the value thereof is "1", enhancement data or the view acquired via the enhancement data is right video.

FIG. 5(b) is a diagram showing an enhancement_type according to one embodiment of the present invention. The enhancement_type indicates the type of the path via which the enhancement data of this event is transmitted. For example, there are a terrestrial channel, the Internet, etc.

If the enhancement_type is 0x0, then this indicates that this event contains all necessary components of a service. This means that enhancement data is contained as the component of this event and is received.

If the enhancement_type is 0x1, then the enhancement data is received via a channel different from a channel via which this event is received and the type of the reception path is equal to that of this event. For example, if the event is a terrestrial wave, the enhancement data is also received via another channel of a terrestrial wave. Detailed path information of the enhancement data uses a linked_TSID field and a linked_program_number field.

If the enhancement_type is 0x2, then this indicates that this event includes only the enhancement data and essential data is transmitted via the same type of path. That is, both the enhancement data and the essential data are received via the terrestrial wave. Similarly, detailed path information of the essential data uses a linked TSI field and a linked_program_number field.

If the enhancement_type is 0x3, then this indicates that the enhancement data of this event is received via the Internet. Path information for accessing the enhancement data uses an internet_linkage_information field.

FIG. 6(a) is a diagram showing a sync_type according to one embodiment of the present invention. The sync_type indicates information about a synchronization and synthesis method for transmission of the component of the event and the enhancement data.

If the sync_type is 0x0, then the component of the event and the enhancement data are simultaneously transmitted. This may be referred to as synchronized transmission.

If the sync_type is 0x1, then the enhancement data is transmitted later than the event. For normal 3D video viewing, this event is recorded and then is linked or synthesized with the enhancement data received later.

If the sync_type is 0x2, then the enhancement data is transmitted earlier than the event. For normal 3D video viewing, the component of the event received in real time is linked/synthesized with the already received/stored enhancement data.

If the sync_type is 0x3, then this is similar to the case in which the sync_type is 0x1 but synchronized transmission of the enhancement data is also possible.

If the sync_type is 0x4, then this is similar to the case in which the sync_type is 0x2 but synchronized transmission of the enhancement data is also possible.

FIG. 6(b) is a diagram showing an enhancement_stream_format according to one embodiment of the present invention. The enhancement_stream_format indicates information about the data format, codec, etc. of the enhancement data of this event. Hereinafter, in the present specification, 0x25 and 0x26 corresponding to the cases of transmitting depth/disparity data will be focused upon.

FIG. 6(c) is a diagram showing an enhancement_stream_sampling_factor according to one embodiment of the present invention. The enhancement_stream_sampling_factor means the resolution of the enhancement data and indicates the sampling factor of the enhancement data in width and height as compared to the video stream (primary video) of this event. If the value thereof is 0x00, this indicates that the enhancement data has the same resolution as the primary video and, if the value thereof is 0xXY, this indicates that the sampling factor of the enhancement data is 1/(X+1) of the primary video in width and is 1/(Y+1) of the primary video in height. For example, in case of the depth/disparity map having a size of ¼ in width and a size of ⅛ in height, this field has a value of 0x37.

An avail_time_start field means a start time when the enhancement data currently configuring 3D video content together with the component of the event is transmitted. The avail_time start field is a 32-bit field and indicates a start time of the event in GPS seconds after 1980.1.6. 00:00:00 UTC. If the value of this field is 0, the enhancement data is always available.

A linked_TSID field means the transport_stream_id value of the transport stream including the enhancement data.

A linked_program_number field indicates the program_number value of a program/channel including the enhancement data. That is, a stream including the enhancement data may be uniquely defined using the linked_TSID and the linked_program_number.

A linked_elementary_PID field may include an elementary PID value of the enhancement data in the event_enhancement_descriptor( ) in addition to the linked_TSID and the linked_program_number.

An internet_linkage_information field provides information about the enhancement data transmitted via the Internet and may include a field indicating whether an IP address is 32 bits or 128 bits, an IP address, a port number, additional information such as a URI of the stream and an available time slot. At this time, the available time slot may include a start time and an expiration time and may overlap the avail_time_start field.

A disparity_near field and a disparty_far field indicate the depth range if the enhancement data is depth information (disparity/depth map). These indicate disparity values corresponding to object points nearest to or farthest from the user.

In the above descriptor, signaling of multiple enhancement streams is possible. In the descriptor, n enhancement streams may be signaled using a loop.

Next, a signaling method using a program map table (PMT) will be described.

FIG. 7 is a diagram showing a syntax structure of a PMT including an event_enhancement_descriptor( ) according to one embodiment of the present invention.

The PMT provides mapping between a program number and a program element. At a program level (a first descriptor loop) or an ES level (a second descriptor loop) of the PMT, enhancement data linked with the program or the program element is signaled using a descriptor.

The PMT includes the following fields.

A table_id field is an 8-bit field and TS_program_map_section is always set to a value of 0x02.

A section_syntax_indicator field has 1 bit and the value thereof is set to 1.

A section_length field has 12 bits and the first two bits are 00. This field indicates the number of bytes of the section and indicates the length from a next field to CRC. The value of this field does not exceed 1021.

A program_number field has 16 bits and indicates to which a program program_map_PID is applied. Definition of one program is transmitted by only one TS_program_map_section. This indicates that program definition cannot exceed 1016.

A version_number field indicates the version of a virtual channel. This field is incremented by one whenever the VCT is changed. If the version value reaches 31, a next version value becomes 0. The value of this field is necessarily equal to the value of the same field of an MGT.

A current_next_indicator field has 1 bit and the value thereof is set to 1 if the VCT is currently applicable. If the value thereof is set to 0, this indicates that the VCT is not applicable and a next table is valid.

The value of a section_number field is set to 0x00.

The value of a last_section_number field is set to 0x00.

A PCR_PID field has 13 bits and indicates a PID of a TS including a PCR field which is valid with respect to the program described by the program number.

A program_info_length field has 12 bits and the first two bits have a value of 00. The remaining 10 bits indicate the descriptor which follows this field in bytes.

A stream_type field has 8 bits and indicates the type of a program element transmitted by packets having a PDI value of a base PID.

Elementary_PID has 13 bits and indicates a PID of a TS including an associated program element.

An ES_info_length field has 12 bits and the first two bits are 00. The remaining 10 bits indicates the descriptor which follows this field in bytes.

A CRC_32 field indicates a CRC value for a zero output of a register within a decoder.

FIG. 8 is a diagram showing a syntax structure of a program_enhancement_descriptor( ) according to one embodiment of the present invention.

The program_enhancement_descriptor( ) of the present invention includes a combined_service_type, an enhancement_type, an enhancement_right_flag, sync_type, an enhancement_stream_format, an enhancement_stream_sampling_factor, a linked_TSID, a linked_program_number, a linked_elementary_PID, an internet_linkage_information, a disparity_near and a disparity_far.

The program_enhancement_data_descriptor provides information about enhancement data linked with the program for implementing a 3D video service. At this time, the provided information indicates linkage with the program.

The enhancement_type indicates the type of path via which the enhancement data for this program is transmitted. The meaning of the value of this field is equal to that defined in the event_enhancement_descriptor( ) but is different therefrom in that this field is not applied in event units but is applied in program units. The functional meanings of the other fields are equal those defined in the event_enhancement_descriptor( ).

The linked_elementary_PID is not essential and may be omitted according to the embodiment.

Next, a signaling method using a terrestrial virtual channel table (TVCT) of an ATSC PSIP will be described.

FIG. 9 is a diagram showing a syntax structure of a TVCT including a channel_enhancement_descriptor( ) according to one embodiment of the present invention.

The TVCT includes attributes of virtual channels included in a transport stream in an ATSC PSIP.

Information included in the TVCT will be described.

The value of a table_id field indicates the type of the table section. In order to indicate the TVCT, the value thereof shall be 0xC8.

A section_syntax_indicator field has 1 bit and the value thereof is fixed to 1.

A private_indicator field is set to 1.

A section_length field has 12 bits and the first two bits are 00. This field indicates the number of bytes of the section and indicates the length from a next field to CRC. The value of this field does not exceed 1021.

A transport_stream_id has 16 bits and indicates an MPEG-2 transport stream (TS) ID. By this field, this TVCT is distinguished from another TVCT.

A version_number field indicates the version of a virtual channel. The value of this field is incremented by one whenever the VCT is changed. If the version value reaches 31, a next version value becomes 0. The value of this field is necessarily equal to the value of the same field of an MGT.

A current_next_indicator field has 1 bit and the value thereof is set to 1 if the VCT is currently applicable. If the value thereof is set to 0, this indicates that the VCT is not applicable and a next table is valid.

A section_number field indicates the number of sections. The value of a first section of the TVCT is 0x00 and the value thereof is incremented by one per additional section.

A last_section_number field indicates the number of the last section, that is, the number of the section having a highest section_number in the TVCT.

A protocol_version field serves to allow another table type different from that defined in the current protocol in the future. In the current protocol, only 0 is valid. A value other than 0 will be structurally used in the subsequent version for another table.

A num_channels_in_section field indicates the number of virtual channels in the VCT section. The value thereof is restricted by the section length.

A short_name field indicates the name of the virtual channel.

A major_channel_number field has 10 bits and indicates a major channel number of a virtual channel defined in corresponding order within a for-loop. Each virtual channel includes a major channel number and a minor channel number. The user may use the major channel number along with the minor channel number with respect to the virtual channel. The major channel number has values of 1 to 99 and the major/minor channel number pair does not have a repeated value within the TVCT.

The minor_channel_number field has 10 bits and has values of 0 to 999. The minor channel number functions as a two-part channel number along with the major channel number. If a service type is ATSC_digital_television or ATSC_audio_only, the minor channel number has values of 1 to 99. The major/minor channel number pair does not have a repeated value within the TVCT.

A modulation_mode field indicates a modulation mode of a transport carrier associated with the virtual channel.

The value of a carrier_frequency field is 0. The carrier frequency can be confirmed using this field.

A channel_TSID field has values of 0x0000 to 0xFFFF and is an MPEG-2 TSID associated with a TS for transferring an MPEG-2 program referred to by this virtual channel.

A program_number field associates a virtual channel defined in the TVCT with an MPEG-2 PROGRAM ASSOCIATION and TS PROGRAM MAP table.

An ETM_location field indicates presence and location of an extended text message (ETM).

An access_controlled field is a 1-bit Boolean flag, indicates an event associated with the virtual channel is accessed and controlled if the value thereof is 1, and indicates that access is not limited if the value thereof is 0.

A hidden field is a 1-bit Boolean flag. If the value thereof is 1, even when the user directly inputs the number, access is not allowed. A hidden virtual channel is skipped if the user performs channel surfing and appears as not being defined.

A hide_guide field is a Boolean flag. If the value thereof is set to 0 with respect to a hidden channel, the virtual channel and event thereof may be displayed on an EPG display. If a hidden bit is not set, this field is ignored. Accordingly, a non-hidden channel and an event thereof belong to the EPG display regardless of the state of the hide_guide bit.

A service_type field confirms the type of a service sent by the virtual channel.

A source_id field confirms a programming source associated with the virtual channel. The source may be any one of video, text, data or audio programming. Source id 0 is a reserved value, has a unique value within a TS for sending the VCT from 0x0001 to 0x0FFF, and has a unique value within a region level from 0x1000 to 0xFFFF.

A descriptors_length field indicates the length of the descriptor which follows the virtual channel in bytes.

A descriptor need not be included in descriptor( ) or one or more descriptors may be included in descriptor( ).

An additional_descriptors_length field indicates the total length of a following VCT descriptor list in bytes.

A CRC_32 field indicates a CRC value for a zero output of a register within a decoder.

At a virtual channel level of the TVCT, using the descriptor, signal information about the enhancement data linked with the component of the virtual channel for providing a 3D video service is signaled. This information indicates linkage with the channel.

FIG. 10 is a diagram showing a syntax structure of a channel_enhancement_descriptor( ) according to one embodiment of the present invention.

The channel_enhancement_descriptor( ) of the present invention includes a combined_service_type, an enhancement_type, an enhancement_right_flag, a sync_type, an enhancement_stream_format, an enhancement_stream_sampling_factor, a linked_TSID, a linked_program_number, a linked_service_a linked_elementary_PID, an internet_linkage_information, a disparity_near and a disparity_far.

The enhancement_type indicates the type of a path via which the enhancement data for the virtual channel is transmitted. For example, there are a terrestrial channel, the Internet, etc. The meaning of this field is equal to the above-described definition but is different therefrom in that this field is not applied in event units or program units but is applied in virtual channel units.

The linked_channel_TSID indicates a transport_stream_id value of a program/channel including a stream to be linked with the present program/channel in order to provide a complete 3D video service.

The linked_channel_program_number indicates a program_number value of a program/channel including a stream to be linked with the present program/channel in order to provide a complete 3D video service.

The linked_major_channel_number indicates a major_channel_number of a channel including a stream to be linked with the present program/channel in order to provide a complete 3D video service.

The linked_minor_channel_number indicates a minor_channel_number of a channel including a stream to be linked with the present program/channel in order to provide a complete 3D video service.

The linked_source_id indicates a source_id value of a channel including a stream to be linked with the present program/channel in order to provide a complete 3D video service.

Next, a signaling method using an SDT of DVB-SI will be described.

At a service level of the SDT, using the descriptor, information about enhancement data linked with a service specified by a service_id is signaled. This information indicates presence of data linked with the service.

FIG. 11 is a diagram showing a syntax structure of an SDT including a service_enhancement_descriptor( ) according to one embodiment of the present invention.

A table_id field is an 8-bit field and indicates that this section belongs to a service description table.

A section_syntax_indicator field is a 1-bit field and the value thereof is set to 1.

A section_length field is a 12-bit field and the first two bits are 00. This field indicates the number of bytes of the section including CRC after this field. The value of this field does not exceed 1021 and the total section length is a maximum of 1024 bytes.

A transport_stream field is a 16-bit field and serves as a label for identifying a TS.

A version number field indicates is a 5-bit field and indicates the version number of a sub_table. The value of this field is incremented by one whenever the sub_table is changed. If the version value reaches 31, a next version value becomes 0.

A current_next_indicator field has 1 bit and the value thereof is set to 1 if a sub_table is currently applicable. If the value thereof is set to 0, this indicates that the SDT is not applicable and a next table is valid.

A section_number field has 8 bits and indicates the number of sections. A first section has a value of 0x00 and the value of this field is incremented by one whenever a section including the same table_id, the same transport_stream_id and the same original_network_id is added.

A last section_number field has 8 bits and indicates the number of a last section (that is, a highest section_number) of the sub_table which is a part of this section.

An original_network_id field is a 16-bit field and serves as a label for identifying a network_id of a transmission system.

A service_id field is a 16-bit field and serves as a label for distinguishing this service from another service included in a TS. This is equal to a program_number of a program_map_section.

An EIT_schedule_flag field is a 1-bit field, which indicates that EIT schedule information for the service is currently included in a TS if the value thereof is set to 1 and indicates that EIT schedule information for the service is not included in a TS if the value thereof is set to 0.

An EIT_present_following_flag field is a 1-bit field, which indicates that EIT_present_following information for the service is currently included in a TS if the value thereof is set to 1 and EIT_present_following information for the service is not included in a TS if the value thereof is set to 0.

A running_status field is a 3-bit field and indicates the status of the service.

A free_CA_mode is a 1-bit field, which indicates that all element streams of the service are not scrambled if the value thereof is set to 0 and indicates that one or more streams are controlled by a CA system if the value thereof is set to 1.

A descriptors_loop_length is a 12-bit field, which indicates the total length of the following descriptor in bytes.

A descriptor( ) includes a service_enhancement_descriptor( ) of the present invention.

A CRC_32 field is a 32-bit field, which indicates a CRC value for a zero output of a register within a decoder.

FIG. 12 is a diagram showing a syntax structure of a service_enhancement_descriptor( ) according to one embodiment of the present invention.

The service_enhancement_descriptor includes a combined_service_type, an enhancement_type, an enhancement_right_flag, a sync_type, an enhancement_stream_format, an enhancement_stream_sampling_factor, a linked_TSID, a linked_original_network_id, a linked_service_a linked_elementary_PID, internet_linkage_information, a disparity_near and a disparity_far.

The enhancement_type indicates the type of a path via which enhancement data for the service is transmitted. For example, there are a terrestrial channel, the Internet, etc. The meaning of this field is equal to the above-described definition but is different therefrom in that this field is applied in service units.

A linked_original_network_id indicates an original_network_id value of a service including a stream to be linked with the present program/service in order to provide a complete 3D video service.

A linked_service_id indicates a service_id value of a service including a stream to be linked with the present program/service in order to provide a complete 3D video service.

In the present embodiment, since the service_id field and the program_number field are included, the linked_program_number field is omitted. However, the linked_program_number field may be included in the service_enhancement_descriptor.

Here, detailed information of a video stream corresponding to the enhancement data may be confirmed by referring to the component_descriptor of the service or by checking a component_tag value or an elementary PID value of the component added to the service_enhancement_descriptor. That is, according to the embodiment, a linked_component_tag field or a linked_elementary_PID field of an associated video/audio stream may be included in a service_enhancement_descriptor and stream related information such as a linked_stream_content field and a linked_component_type field may also be included.

Alternatively, using a service level linkage_descriptor, information about enhancement data for the service may be signaled. In this case, information about the enhancement data linked with the service is included in the linkage_descriptor and the description thereof is equal to that of the service_enhancement_descriptor.

Next, a signaling method using an EIT of DVB-SI will be described.

At an event level of an EIT, using a descriptor, signaling of enhancement data linked with this event is performed. The syntax structure of the EIT is slightly different from that of the EIT of the ATSC PSIP.

FIG. 13 is a diagram showing a syntax structure of an EIT including an event_enhancement_descriptor2( ) according to one embodiment of the present invention.

A table_id field is an 8-bit field and indicates that this section belongs to a service description table.

A section_syntax_indicator field is a 1-bit field and the value thereof is set to 1.

A section_length field is a 12-bit field, which indicates the number of bytes of the section including CRC after this field. The value of this field does not exceed 4093 and the total section length is a maximum of 4096 bytes.

A service_id field is a 16-bit field, which serves as a label for distinguishing this service from another service of a TS. The service_id has the same value as the program_number of the program_map_section corresponding thereto.

A version_number field indicates is a 5-bit field and indicates the version number of a sub_table. The value of this field is incremented by one whenever the sub_table is changed. If the version value reaches 31, a next version value becomes 0.

A current_next_indicator field has 1 bit and the value thereof is set to 1 if a sub_table is currently applicable. If the value thereof is set to 0, this indicates that the SDT is not applicable and a next table is valid.

A section_number field has 8 bits and indicates the number of sections. A first section has a value of 0x00 and the value of this field is incremented by one whenever a section including the same table_id, the same transport_stream_id and the same original_network_id is added.

A last_section_number field has 8 bits and indicates the number of a last section (that is, a highest section_number) of the sub_table which is a part of this section.

A transport_stream_field is a 16-bit field, which serves as a label for identifying a TS.

An original_network_id field is a 16-bit field and serves as a label for identifying a network_id of a transmission system.

A segment_last_section_number is an 8-bit field, which indicates the number of a last section of a segment of the sub_table. This field has the same value as the last_section_number field with respect to the sub_table which is not divided into segments.

A last_table_id is an 8-bit field, which indicates a last table_id.

An event_id value is a 16-bit field, which includes an id number indicating the event (which is uniquely assigned in a service definition).

A start_time field is a 40-bit field and indicates a start time of an event in coordinated universal time (UTC) format or Modified Julian Date (MJD) format. This field includes 16 bits coded by 16 LSBs and 24 bits coded by 6 digits of 4-bit binary coded decimal (BCD). If the start time is not defined (e.g., NVOD service), all bits are set to 1.

A duration field is a 24-bit field and indicates the duration of an event in hours, minutes or seconds. Accordingly, the duration is expressed as 6 digits of 4-bit BCD and has 24 bits.

A running_status is a 3-bit field and indicates the status of an event. This field is set to 0 in case of an NVOD event.

A free_CA_mode is a 1-bit field, indicates that all element streams of a service are not scrambled if the value thereof is set to 0 and indicates that one or more streams are controlled by a CA system if the value thereof is set to 1.

A descriptors_loop_length field is a 12-bit field and indicates the total length of the following descriptor in bytes.

A CRC_32 field is a 32-bit field and indicates a CRC value for a zero output of a register within a decoder.

FIG. 14 is a diagram showing a syntax structure of an event_enhancement_descriptor2( ) according to one embodiment of the present invention.

The event_enhancement_descriptor2( ) includes a combined_service_type, an enhancement_type, an enhancement_right_flag, a sync_type, an enhancement_stream_format, an enhancement_stream_sampling_factor, an avail_time_start, a linked_event_id, a linked_TSID, a linked_original_network_id, a linked_service_id, internet_linkage_information, a disparity_near and a disparity_far.

The components have been described above.

Information about the enhancement data of the event may be signaled using a linkage_descriptor of an event level. In this case, information about enhancement data linked with the event is included in the linkage_descriptor and includes the same content as the event_enhancement_descriptor2( ).

Hereinafter, considerations for backward compatibility will be described.

First, restrictions on a secondary channel service (enhancement (non-essential) channel/service) will be described.

In general, elements configuring a stereoscopic 3D video service receive primary video via an essential channel (legacy compatible channel) via which 2D video is received and acquire information about SI, etc. of the essential channel to access enhancement data based on this information.

Fundamentally, a channel for transmitting enhancement data cannot provide an independent service and the following restrictions are set in order to prevent malfunction of a conventional receiver.

In case of the ATSC TVCT, a service_type is set to 0x07 (parameterized service) or 0x0A (non-stand-alone type service carrying additional data).

A stream_type indicates depth/disparity data coded by AVC/H.264 and depth/disparity data coded by MPEG-2. When specifying new a stream_type, the MPEG-2 registration_descriptor is used. For example, if the stream_type value of the depth/disparity data coded by AVC/H.264 is set to 0x83, the format_identifier field of the registration_descriptor has a value of "DIS1"—(0x4449 5331) and the additional_idenfication_info field has a value of 0x83.

In case of a DVB SDT/EIT, a service_type is set to 0x1F (non-essential stereoscopic service carrying only additional/enhancement stream).

In case of stream_content and a component_type, a combination of the stream_content and the component_type of the existing high definition video (MPEG-2 or H.264/AVC) is used or a combination for secondary video is newly defined.

FIG. 15 is a diagram showing a new combination of stream_content and a component_type according to one embodiment of the present invention. If the stream_content is set to 0x01 and the component_type is set to 0x13, this indicates MPEG-2 video and depth/disparity map data and, if the stream_content is 0x05 and the component_type is set to 0x86, this indicates H.264/AVC video and depth/disparity map data.

Hereinafter, when a path via which secondary video is received is an enhancement channel, a configuration method of this enhancement channel will be described.

The enhancement channel is not recognized as a service channel or is ignored by an existing receiver for compatibility with an existing HD receiver and signaling may be configured so as not to be recognized as a service by a 3D receiver. Secondary video is transmitted using such enhancement channel. There are a method of inserting such secondary video into a service recognizable by an existing receiver and requesting that the secondary video should not be recognized and a method of configuring and transmitting a transport stream such that the secondary video cannot be recognized by the existing receiver.

First, a method of utilizing a separate (hidden) service will be described.

Figure 16:
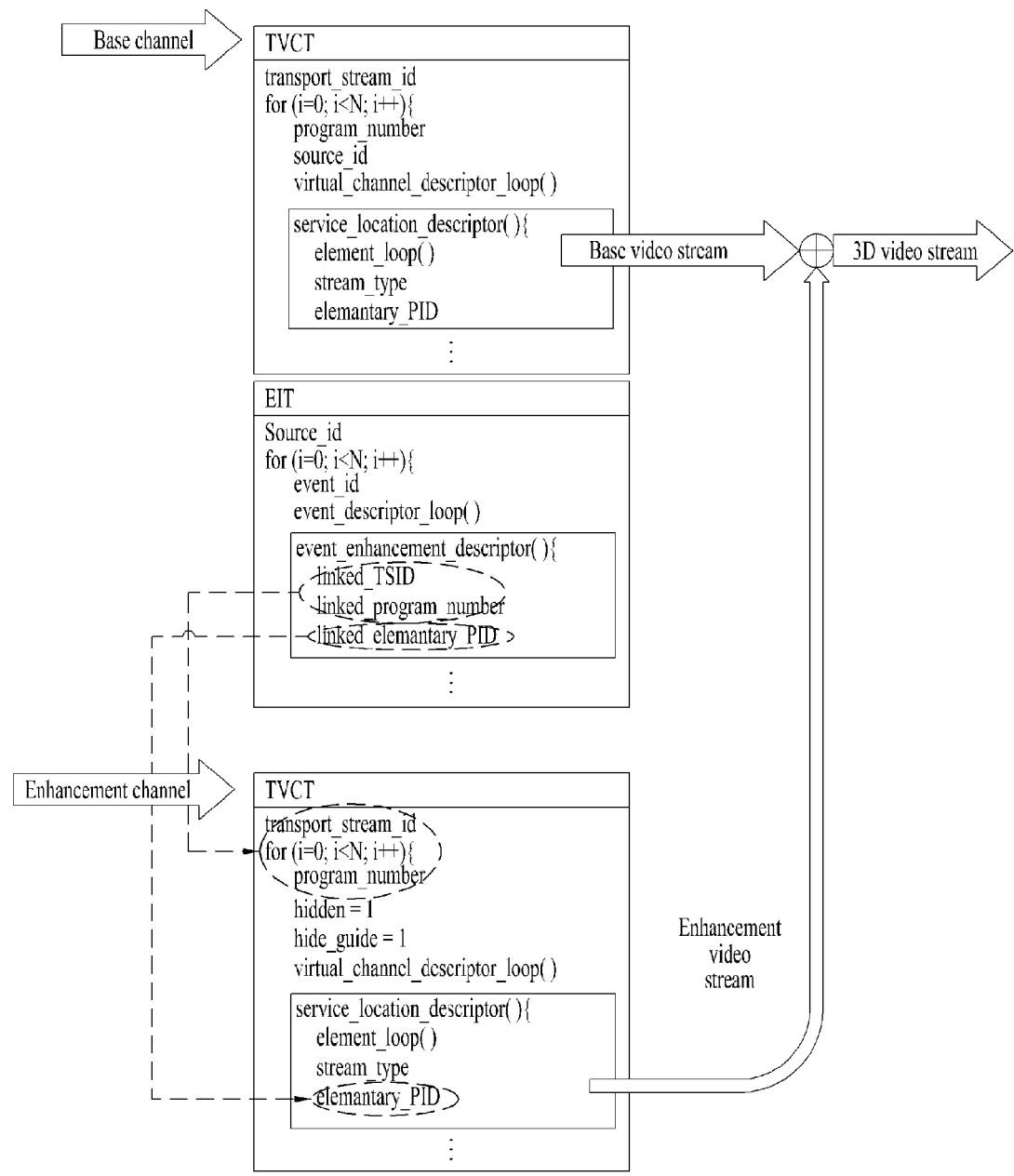
FIG. 16 is a diagram showing signaling for requesting that an existing receiver should not recognize secondary video in an ATSC PSIP environment according to one embodiment of the present invention.
Figure 17:
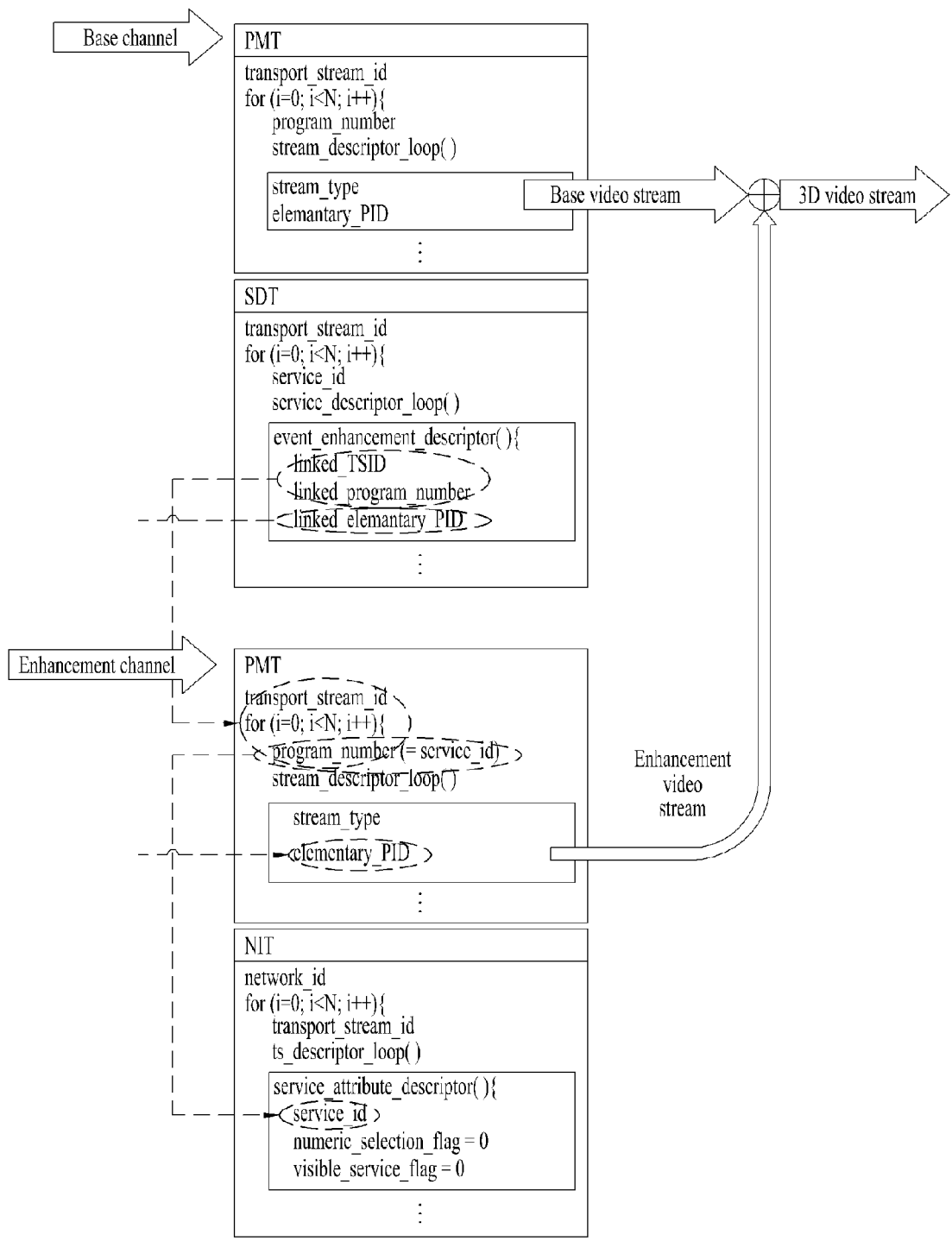
FIG. 17 is a diagram showing signaling for requesting that an existing receiver should not recognize secondary video in a DVB-SI environment according to one embodiment of the present invention.

In case of a method of inserting such secondary video into a service recognizable by an existing receiver and requesting that the secondary video should not be recognized, signaling of FIGS. 16 and 17 is necessary.

FIG. 16 is a diagram showing signaling for requesting that an existing receiver should not recognize secondary video in an ATSC PSIP environment according to one embodiment of the present invention.

An enhancement channel activates a hidden bit of a TVCT to "1" and excludes the hidden bit from a map of an existing receiver. During a test period, a hide-guide bit of the TVCT may be activated to "1" and may be deactivated after standardization.

Signaling of a secondary video stream of a base channel (a channel via which primary video is received) may use a combination of a program number of a TVCT and a component type. As described above, a linked_program_number, a linked_tsid and a linked_elementary_PID may be used.

FIG. 17 is a diagram showing signaling for requesting that an existing receiver should not recognize secondary video in a DVB-SI environment according to one embodiment of the present invention.

In case of an enhancement channel, a hidden service is not explicitly supported with respect to DVB-SI. Instead, an item corresponding to the hidden service is included in the standard of each country and the function thereof is activated such that the enhancement channel is not included in a channel map. In UK standard D-Book, if a numeric selection flag and a visible service flag of a service attribute descriptor included in an NIT $2^{nd}$ loop is set to "0", in the existing receiver, the channel is not displayed, is not selected using the numeral key of the remote controller and thus is not included in the channel map.

Signaling of a secondary video stream of a base channel may use a combination of an original network id, a transport stream id and a component type of an SDT. For example, a linked_original_network_id, a linked_tsid, a linked_service_id and a linked_elementary_PID may be used.

Next, a method of utilizing a separate (independent) component will be described. If secondary video is transmitted so as not to be recognized by an existing receiver, the following signaling is necessary.

Figure 18:
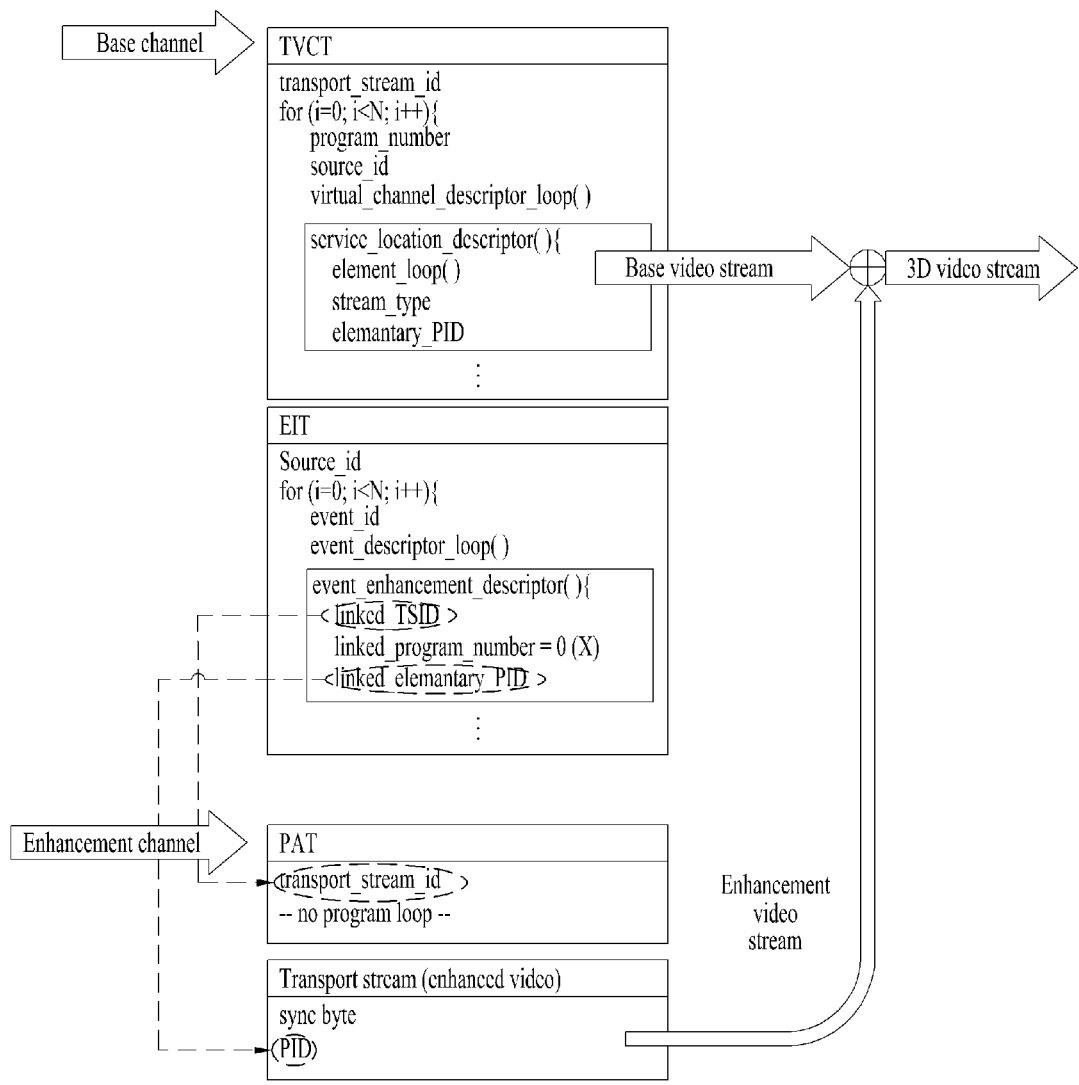
FIG. 18 is a diagram showing signaling for preventing an existing receiver from recognizing secondary video in an ATSC PSIP environment according to one embodiment of the present invention.

FIG. 18 is a diagram showing signaling for preventing an existing receiver from recognizing secondary video in an ATSC PSIP environment according to one embodiment of the present invention.

Figure 19:
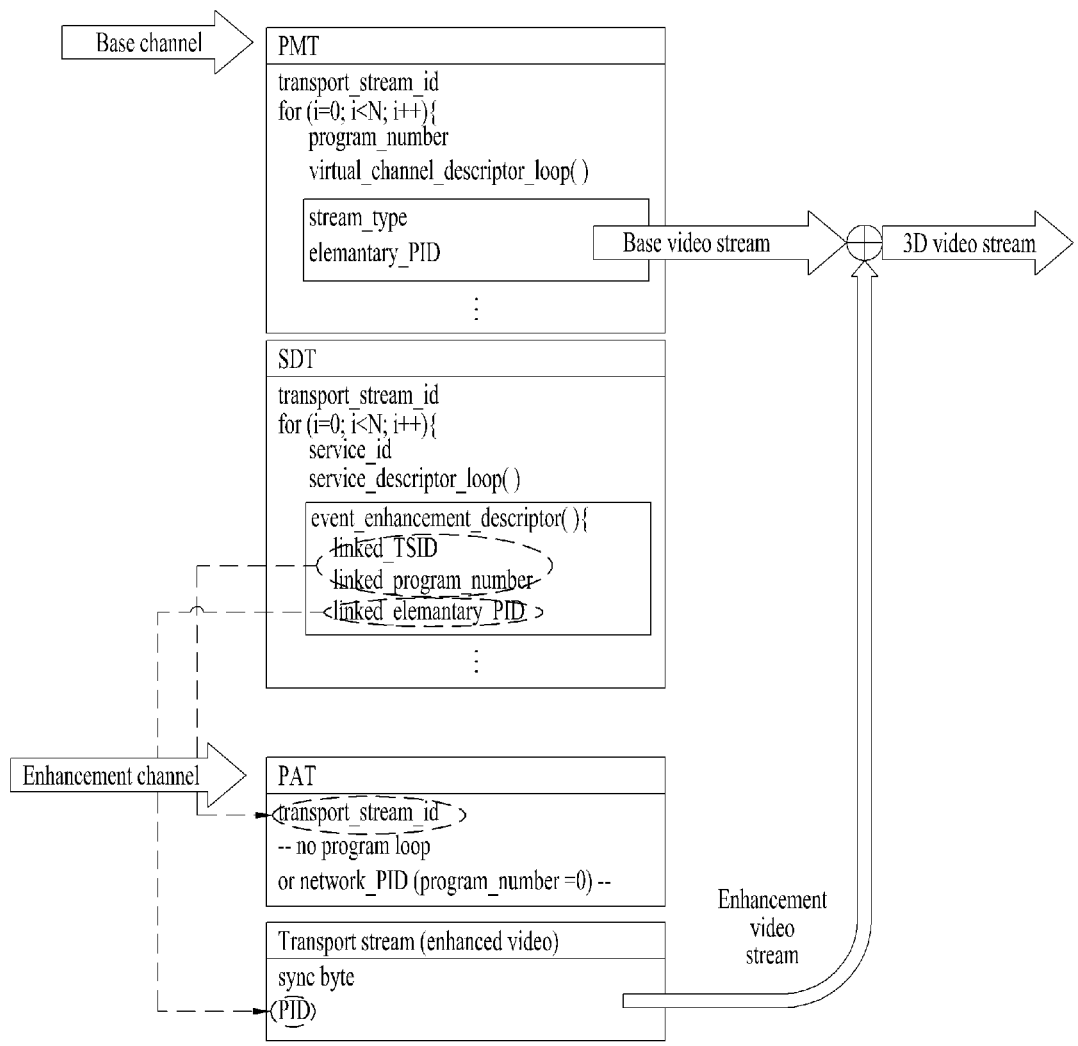
FIG. 19 is a diagram showing signaling for preventing an existing receiver from recognizing secondary video in a DVB-SI environment according to one embodiment of the present invention.

FIG. 19 is a diagram showing signaling for preventing an existing receiver from recognizing secondary video in a DVB-SI environment according to one embodiment of the present invention.

In case of an enhancement channel, PSI information is limited to a PAT in a TS. Thus, an existing receiver can detect a signal of this channel but does not recognize the signal as a service and exclude the signal from the map. A program_loop is not present or program_number=0 is set such that the existing receiver cannot detect the signal. A program is not present and only a network_PID is present.

In case of a base channel, signaling of a secondary video stream is composed of a combination of a transport_tream_id and a PID, for example, a combination of the above-described linked_tsid and the linked_elementary_PID. That is, in case of the enhancement channel, only a secondary video stream is transmitted without a PMT.

Hereinafter, a synchronization method of a video signal and depth information (depth/disparity) will be described.

First, synchronization of a transport packet level will be described.

FIG. 20 is a diagram showing a transport_packet( ) according to one embodiment of the present invention. A transport packet level synchronization method is a method of transmitting synchronization information using an adaptation_field( ) of a transport packet. A transport packet including a video component received via an existing channel and a transport packet including enhancement data received via a separate channel match or align so as to perform synchronization at a transport stream.

FIG. 21 is a diagram showing an adaptation_field( ) according to one embodiment of the present invention. For synchronization, a transport_field_extension_flag of the adaptation_field( ) is set to 1 and information regarding how many private_data_bytes are used is signaled using a transport_private_data_length. In addition, frame number information of video/depth is signaled via video_frame_info_data_byte. A reception device controls synchronization of elements configuring a 3D video service received via multiple paths using the above information.

FIG. 22(a) is a diagram showing the syntax of a video_frame_info_data_byte according to one embodiment of the present invention. The video_frame_info_data_byte is located at a private_data_type of an adaptation_field of a transport packet and has the structure of FIG. 22(a). Here, the meaning of video_frame_info is determined according to the setting value of the frame_info_type included in the video_frame_info_data_byte as shown in FIG. 22(b).

When the frame_info_type is 0x01, the video_frame_info means a decoding order number. When the video_frame_info means the decoding order number, video decoding structures (GOP structures) of two components should be the same.

When the frame_info_type is 0x02, the video_frame_info means a display order number. If the frame_info_type is 0x03, the video_frame_info means a PTS value of a clock frequency of 90 KHz. Here, the PTS is an abbreviation for a presentation time stamp and indicates when a decoded access unit is reproduced.

If the frame_info_type is 0x04, the video_frame_info indicates an absolute time of display. A most significant bit (MSB) of this field is set to and the number of remaining bits is 32 and the remaining bits indicate a time in GPS seconds after 1980.1.6. 00:00:00 UTC.

If the frame_info_type is 0x05, the video_frame_info means a modified PTS. This is a time stamp related to the video_frame_info value of a first picture in a video element set to 0. That is, the video_frame_info of an individual picture is a relative count value according to a display time of a first picture of a video element. The unit of the above count is equal to the period of a system clock of a frequency of 90 KHz.

Next, a video level synchronization method will be described.

Figure 23:
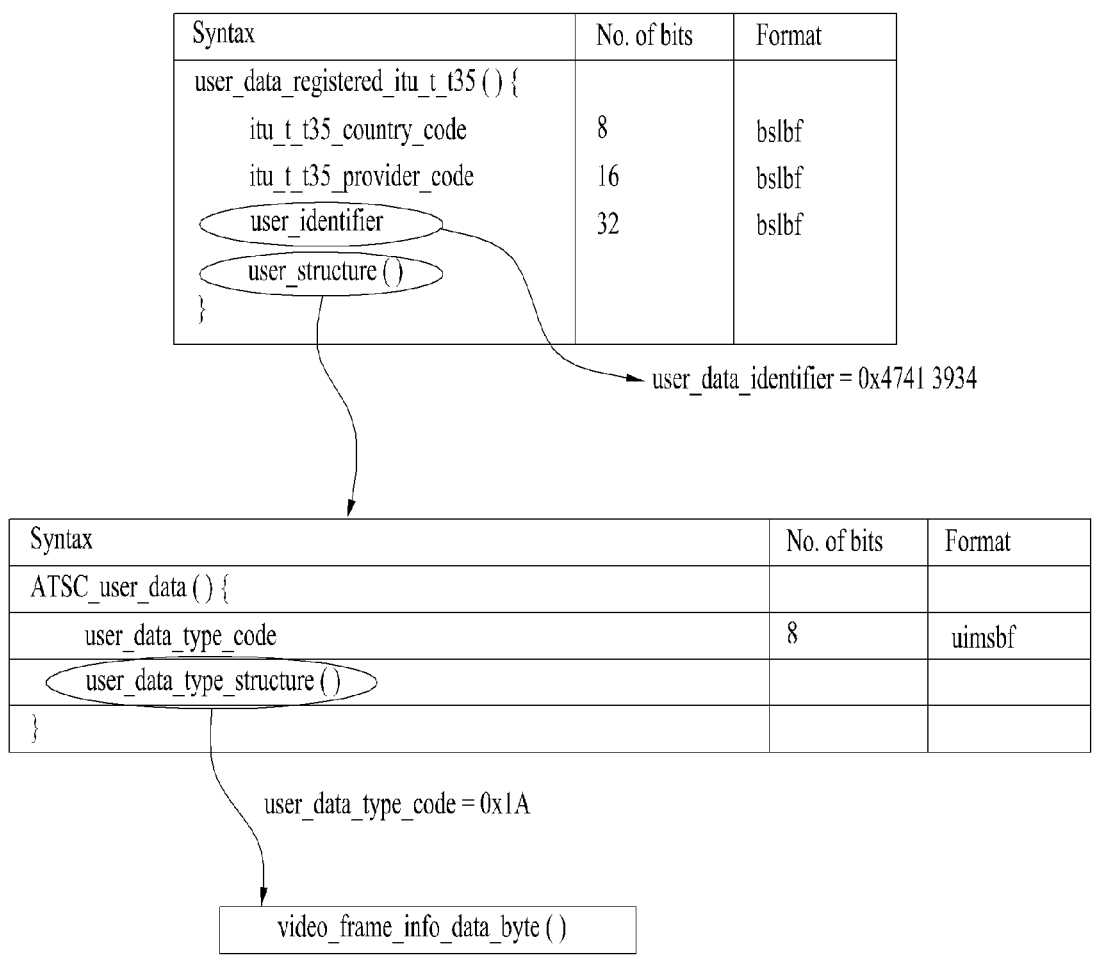
FIG. 23 is a diagram showing a video level synchronization method according to one embodiment of the present invention.

FIG. 23 is a diagram showing a video level synchronization method according to one embodiment of the present invention. In case of AVC/H.264 video, a video_frame_info_data_byte is transmitted in frame units using an SEI message. Accordingly, a video_frame_info field included in a user_data_registered_itu_t_135 SEI message and a video_frame_info field of an SEI message included in an AVC/H.264 video stream may match to perform synchronization of two streams. For reference, an itu_t_35_country_code field and an itu_t_t35_provider_code field use a value specified in the ITU-T T.35 recommendations and respectively have 0xB5 and 0x0031 in case of ATSC.

In case of MPEG-2 video, the video_frame_info_data_byte is transmitted in a state of being included in picture user data.

Next, a system level synchronization method will be described.

In a system level synchronization method, synchronization is performed using a PTS value included in a PES for an essential video stream (2D image) and a secondary video stream (enhancement stream). A method of using a PTS value is advantageous in that synchronization of independent elements received via a heterogeneous path while maintaining an existing specification and is disadvantageous in that it is difficult to set a common clock (PCR) for the PTS due to independent characteristics of the elements and the PTSs of the matching frames may not match even when the common clock is present. As a result, in regard to the PTS, even in the encoder, it is necessary to minutely synchronize two codecs. In addition, in case of non-real-time linkage, it is difficult to match the PTSs of a previously stored stream and a stream received in real time.

Next, operation of a reception device will be described.

Figure 24:
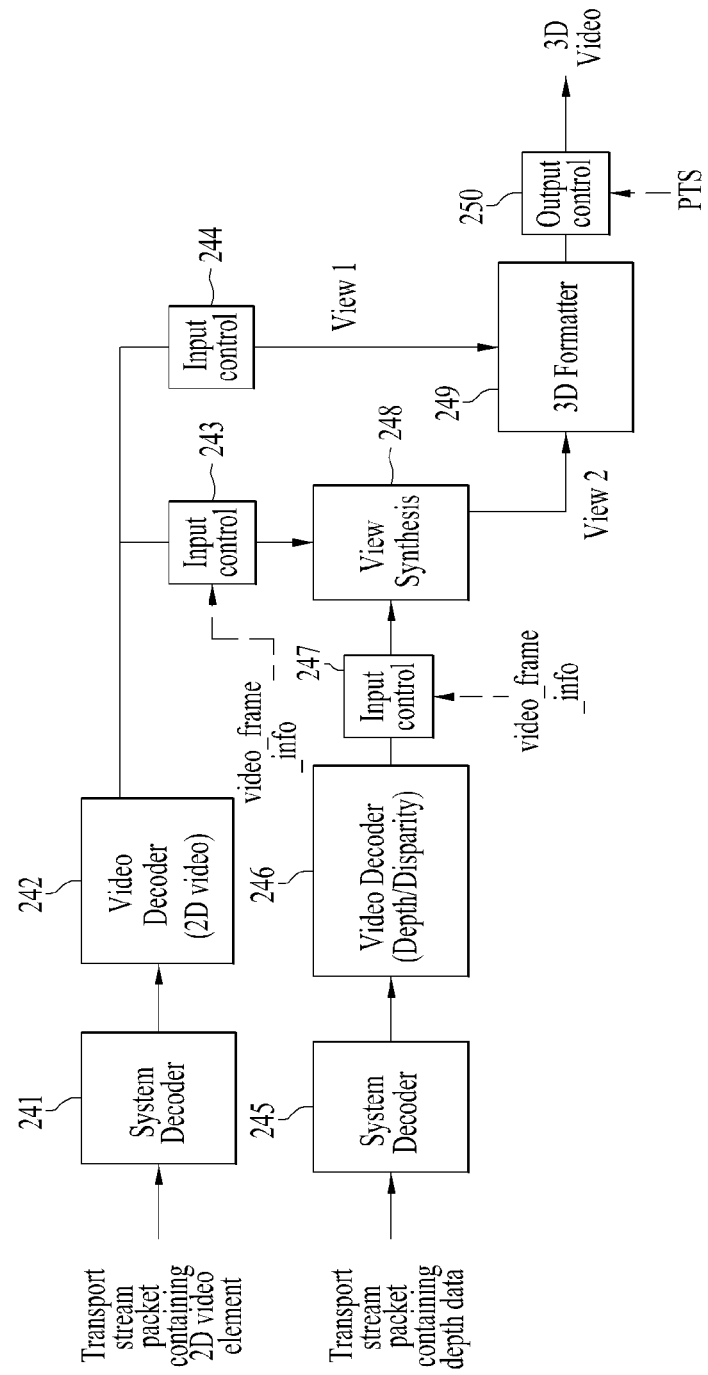
FIG. 24 is a diagram showing a digital broadcast reception device according to one embodiment of the present invention.

FIG. 24 is a diagram showing a digital broadcast reception device according to one embodiment of the present invention. The digital broadcast reception device according to the present invention includes a plurality of system decoders 241 and 245, a plurality of video decoders 242 and 246, a plurality of input controllers 243, 244 and 247, a view synthesizer 248, an output formatter 249 and an output controller 250.

Video decoding and synchronization and view synthesis for providing a 3D video service using depth/disparity data will now be described. The reception device extracts synchronization information from a 2D video signal and a depth/disparity stream input to the system decoders 241 and 245. Synchronization information may use 1) video_frame_info included in a transport packet, 2) video_frame_info included in an SEI message or user data of a video stream or 3) a PTS value included in a PES packet header as described above. The acquired synchronization information is used for matching of the 2D video signal and depth/disparity data decoded independently decoded by the video decoders 242 and 246. In case of 1) and 3), this information is acquired by the system decoders 241 and 245 and is delivered to the input controllers 243 and 247 before the view synthesizer and, in case of 2), this information is acquired by the video decoders 242 and 246 and is delivered to the input controllers 243 and 247 before the view synthesizer 248.

When video_frame_info is used to synchronize the components of 3D stereoscopic video signal, output timing information of an actual image uses an existing PTS value. That is, video_frame_info is used for synchronization of two elements received via a heterogeneous path, and control of output timing of an actual 3D view (other view synthesis using 2D+enhancement data) and synchronization of a 3D view and an audio signal is based on the PTS.

The view synthesizer 248 generates another view configuring a stereoscopic 3D video signal using a 2D video signal and depth/disparity data corresponding thereto. As a result, synchronization of the 2D video signal and the depth/disparity stream should be performed just before being input to the view synthesizer 248.

The secondary video (the right image or the left image) generated by the view synthesis and the primary video (the left image or the right image) received via the existing channel are output on the 3D display via the output formatter 249 as 3D video. Output timing of the 3D video is controlled based on the PTS by the output controller 250.

Figure 25:
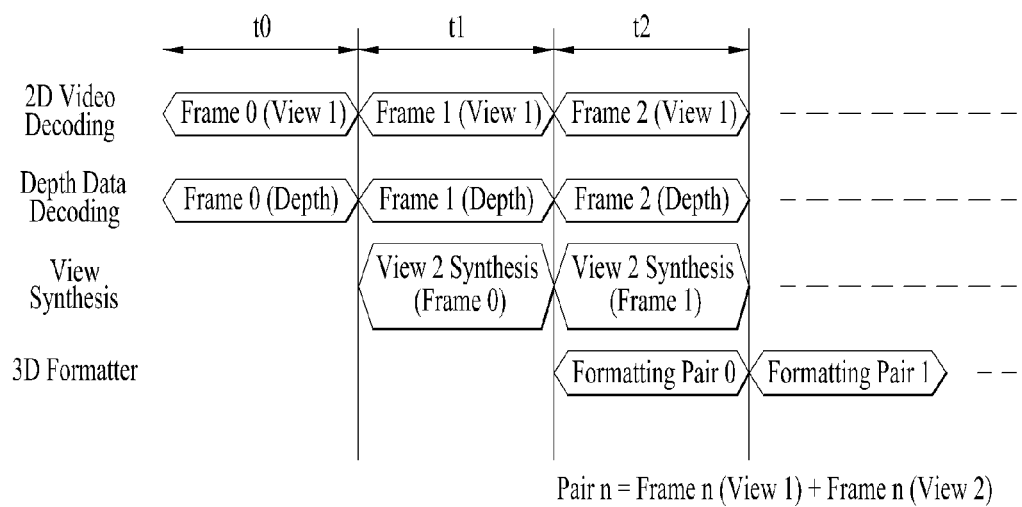
FIG. 25 is a diagram showing a view synthesis and synchronization operation according to one embodiment of the present invention.

FIG. 25 is a diagram showing a view synthesis and synchronization operation according to one embodiment of the present invention. FIG. 25 shows the order of generating the 3D video signal with lapse of time when a 3D video signal is provided using a 2D video signal and depth data.

At t0, Frame 0 of a primary view is obtained via decoding of the 2D video signal and depth information of Frame 0 is obtained via decoding of the depth data.

At t1, Frame 1 of a primary view is obtained via decoding of the 2D video signal and depth information of Frame 1 is obtained via decoding of the depth data. Simultaneously, Frame 0 of a secondary view is obtained using Frame 0 of the primary view and depth information of Frame 0 via the view synthesizer.

At t2, Frame 2 of a primary view is obtained via decoding of the 2D video signal and depth information of Frame 2 is obtained via decoding of the depth information. In addition, Frame 1 of a secondary view is obtained using Frame 1 of the primary view and the depth information of Frame 1 via the view synthesizer. Simultaneously, via the output formatter, a formatting pair 0 which is a 3D video signal is obtained using Frame 0 of the primary view and the secondary view. Through such a process, it is possible to provide the 3D video signal to the user.

Finally, a method of receiving stereoscopic components at a reception device will be described. A 2D video signal means a video signal received via an existing digital TV channel, which is encoded into MPEG-2 video and may be encoded using AVC/H.264 or another codec. A method of receiving a 2D video signal is equal to an existing digital TV service reception method. In this case, using an SI section received via this channel, information about presence of enhancement data, a synthesis service format, a reception channel/path, an acquirable time, etc. is checked.

In the present invention, the enhancement data means depth map and a disparity map data. The enhancement data may include occlusion and transparency information according to circumstance and may be referred to as a depth map for convenience. A 3D video signal reception device synthesizes a 2D video signal received via an existing channel and enhancement data to configure another view configuring a 3D stereoscopic video signal. In enhancement data, there are two methods such as real-time linkage and non-real-time linkage.

First, in case of real-time linkage, enhancement data is received via the Internet or another terrestrial channel together with a 2D video signal received via an existing channel. At this time, the two components are subjected to real-time reception and real-time decoding to provide real-time 3D video to the user.

In case of non-real-time linkage, enhancement data is previously received via the Internet or a terrestrial channel before a broadcast time of a 2D video signal and is stored in a storage device. An NRT method and a method of recording live enhancement data are both possible. If a 2D video signal is broadcast via an existing channel, 3D video is output via synchronization with the 2D video signal received while reproducing the pre-recorded/stored enhancement data. That is, an actual broadcast is a 2D live broadcast, but a receiver for pre-storing enhancement data may provide 3D video live.

When two or more enhancement data streams are transmitted, a depth range suitable for user preference may be selected using the disparity_near and disparity_far field of each stream. That is, depth control may be implemented via 3D rendering using the received map or selective reception of multiple depth maps.

MODE FOR INVENTION

Various embodiments have been described in the best mode for carrying out the invention.

INDUSTRIAL APPLICABILITY

As described above, the present invention is wholly or partially applicable to a digital broadcast system.

The invention claimed is:

1. A digital broadcast signal processing method for providing stereoscopic three-dimensional (3D) video, the digital broadcast signal processing method comprising:
   encoding a video stream of two-dimensional (2D) primary video;
   encoding a video stream of secondary video for generating binocular-parallax 3D video together with the encoded video stream of the 2D primary video;
   generating first signaling information for the primary video and second signaling information for the secondary video;
   generating a first broadcast signal including the encoded video stream of the primary video and the first signaling information;
   generating a second broadcast signal including the encoded video stream of the secondary video and the second signaling information; and
   transmitting at least one of the first broadcast signal via a first channel of a broadcast network and the second broadcast signal via a second channel of the broadcast network,
   wherein the first signaling information includes enhancement type information indicating whether the secondary video is transmitted via the second channel of the broadcast network or a broadband network,
   wherein the first signaling information further includes sync type information indicating whether the secondary video is transmitted in real time or in non-real time,
   wherein the second signaling information which is transmitted in the second broadcast signal via the second channel of the broadcast network includes first information indicating whether or not the secondary video is inactivated in a receiver.

2. The digital broadcast signal processing method according to claim 1, wherein the second signaling information further includes second information indicating whether or not the second channel appears in Electronic Program Guide (EPG) displays.

3. The digital broadcast signal processing method according to claim 1, wherein the generating the second signaling information includes generating the second signaling information for preventing a 2D video signal receiver from recognizing the encoded video stream of the secondary video.

4. The digital broadcast signal processing method according to claim 3, wherein the generating the second signaling information includes limiting the second signaling information of a stream transmitted by the second broadcast signal to only a PAT, and
   wherein the generating the second signaling information includes deleting a program_loop or setting a program_number to 0.

5. A digital broadcast signal processing device for providing stereoscopic three-dimensional video, the digital broadcast signal processing device comprising:
   a first video encoder for encoding a video stream of two-dimensional (2D) primary video;
   a second video encoder for encoding a video stream of secondary video for generating binocular-parallax 3D video together with the encoded video stream of the 2D primary video;
   an SI processor for generating first signaling information for the primary video and second signaling information for the secondary video;

a first system encoder for generating a first broadcast signal including the encoded video stream of the primary video and the first signaling information;

a second system encoder for generating a second broadcast signal including the encoded video stream of the secondary video and the second signaling information; and a transmission unit for transmitting at least one of the first broadcast signal via a first channel of a broadcast network and the second broadcast signal via a second channel of the broadcast network, wherein the first signaling information includes enhancement type information indicating whether the secondary video is transmitted via the second channel of the broadcast network or a broadband network, wherein the first signaling information further includes sync type information indicating whether the secondary video is transmitted in real time or in non-real time, wherein the second signaling information which is transmitted in the second broadcast signal via the second channel of the broadcast network includes first information indicating whether or not the secondary video is inactivated in a receiver.

6. The digital broadcast signal processing device according to claim 5, wherein the second signaling information further includes second information indicating whether or not the second channel appears in Electronic Program Guide (EPG) displays.

7. The digital broadcast signal processing device according to claim 5, wherein the SI processor generates the signaling information for preventing a 2D video signal receiver from recognizing the encoded video stream of the secondary video.

8. The digital broadcast signal processing device according to claim 7, wherein the SI processor limits the second signaling information of a stream transmitted by the second broadcast signal to only a PAT, and wherein the SI processor deletes a program_loop or sets a program_number to 0.

* * * * *